United States Patent
Kasten

(10) Patent No.: US 10,710,902 B2
(45) Date of Patent: Jul. 14, 2020

(54) SYSTEM AND APPARATUS FOR DETERMINING AND CONTROLLING WATER CLARITY

(71) Applicant: Stephen P. Kasten, Prescott, AZ (US)

(72) Inventor: Stephen P. Kasten, Prescott, AZ (US)

( * ) Notice: Subject to any disclaimer, the term of this patent is extended or adjusted under 35 U.S.C. 154(b) by 965 days.

(21) Appl. No.: 14/283,868

(22) Filed: May 21, 2014

(65) Prior Publication Data

US 2014/0346122 A1 Nov. 27, 2014

Related U.S. Application Data

(60) Provisional application No. 61/920,421, filed on Dec. 23, 2013, provisional application No. 61/885,353, filed on Oct. 1, 2013, provisional application No. 61/825,965, filed on May 21, 2013.

(51) Int. Cl.
| | |
|---|---|
| G05D 21/02 | (2006.01) |
| C02F 1/00 | (2006.01) |
| C02F 1/76 | (2006.01) |
| G21K 5/08 | (2006.01) |
| C02F 1/32 | (2006.01) |
| C02F 103/42 | (2006.01) |

(52) U.S. Cl.
CPC ............. *C02F 1/008* (2013.01); *C02F 1/763* (2013.01); *G05D 21/02* (2013.01); *G21K 5/08* (2013.01); *C02F 1/004* (2013.01); *C02F 1/32* (2013.01); *C02F 1/76* (2013.01); *C02F 1/766* (2013.01); *C02F 2103/42* (2013.01); *C02F 2209/001* (2013.01); *C02F 2209/006* (2013.01); *C02F 2209/008* (2013.01); *C02F 2209/11* (2013.01); *C02F 2303/04* (2013.01); *C02F 2305/02* (2013.01)

(58) Field of Classification Search
CPC .. C02F 1/008; C02F 1/76; C02F 1/763; C02F 2103/046; C02F 2209/001; C02F 2209/003; C02F 2209/006; C02F 2209/008; C02F 2209/11; C02F 2301/04; G01N 21/5346; G01N 21/534; G01N 33/1893
USPC .......................................... 210/745; 356/338
See application file for complete search history.

(56) References Cited

U.S. PATENT DOCUMENTS

| | | | | |
|---|---|---|---|---|
| 2,204,225 | A * | 6/1940 | Merckel | B01D 24/24 210/745 |
| 2,251,149 | A * | 7/1941 | Merckel | C02F 1/52 137/3 |
| 4,263,511 | A | 4/1981 | Hirschberg | |
| 4,725,148 | A | 2/1988 | Endo et al. | |
| 5,241,368 | A | 8/1993 | Ponstingl et al. | |
| 5,453,832 | A | 9/1995 | Joyce | |

(Continued)

FOREIGN PATENT DOCUMENTS

| | | | |
|---|---|---|---|
| CA | 2316943 C | 1/2009 | |
| WO | WO 2012012834 A1 * | 2/2012 | ............ C02F 1/008 |

OTHER PUBLICATIONS

International Search Report and the Written Opinion of the International Searching Authority for related PCT application No. PCT/US14/39032 dated Nov. 4, 2014.

*Primary Examiner* — Matthew O Savage
(74) *Attorney, Agent, or Firm* — Zeman-Mullen & Ford, LLP

(57) ABSTRACT

A system, method and apparatus for determining and controlling water clarity or water opacity especially useful in pools, spas, and contained bodies of water.

12 Claims, 6 Drawing Sheets

(56) References Cited

U.S. PATENT DOCUMENTS

| | | | |
|---|---|---|---|
| 5,489,977 | A | 2/1996 | Winslow et al. |
| 5,972,211 | A * | 10/1999 | Jones .................. C02F 1/004 |
| | | | 210/263 |
| 6,324,900 | B1 | 12/2001 | Bruno et al. |
| 6,836,332 | B2 | 12/2004 | Mosley et al. |
| 7,242,001 | B1 | 7/2007 | Hedges et al. |
| 7,400,407 | B2 | 7/2008 | Ng et al. |
| 8,212,222 | B2 | 7/2012 | Shakespeare et al. |
| 2002/0014410 | A1 | 2/2002 | Silveri et al. |
| 2005/0190370 | A1* | 9/2005 | Ciobanu ............. G01N 21/274 |
| | | | 356/442 |
| 2006/0049115 | A1 | 3/2006 | Birkbeck |
| 2006/0177555 | A1 | 8/2006 | Doi et al. |
| 2006/0198761 | A1 | 9/2006 | Tokhtuev et al. |
| 2007/0114175 | A1 | 5/2007 | Suzuki et al. |
| 2008/0285012 | A1 | 11/2008 | Shakespeare et al. |
| 2010/0206787 | A1 | 8/2010 | Rozenberg et al. |
| 2011/0043807 | A1 | 2/2011 | Andelic et al. |
| 2011/0253638 | A1* | 10/2011 | Easland ................ C02F 1/004 |
| | | | 210/745 |
| 2011/0273710 | A1 | 11/2011 | Dong et al. |
| 2012/0162645 | A1 | 6/2012 | Andelic et al. |

\* cited by examiner

SYSTEM AND APPARATUS FOR DETERMINING AND CONTROLLING WATER CLARITY

CROSS-REFERENCE TO RELATED APPLICATIONS

This application claims priority to provisional patent application having Ser. No. 61/825,965, filed May 21, 2013, provisional patent application having Ser. No. 61/885,353, filed Oct. 1, 2013, and provisional patent application having Ser. No. 61/920,421, filed Dec. 23, 2013, which are all herein incorporated by reference in their entireties.

FIELD OF INVENTION

The present invention is directed to a system and apparatus for determining and controlling water clarity. More specifically, the present invention is directed to a system and apparatus for determining and controlling water clarity that includes a water chamber having an inlet, an outlet, and a transparent lens or window, a light source capable of lighting up the water contained in the water chamber, a light sensitive detection circuit positioned near the transparent lens or window of the water chamber, and a control unit capable of receiving an output signal from the light sensitive detection circuit to determine water clarity and/or to send a signal to a water treatment system. The water chamber may specifically be a spa or a pool.

The present invention is also directed to a method for determining and controlling water clarity in a spa and/or pool which includes the steps of providing a water chamber having at least one transparent window, a water inlet, and a water outlet, directing water from the spa and/or pool through the water chamber, employing a light source to light up water contained in the water chamber, providing a light sensitive detection circuit near the transparent window, and employing a control unit to receive an output from the light sensitive detection circuit to determine clarity of the spa or pool water and/or to send a signal to a water treatment system for treating the spa or pool. The system and method for determining and controlling water clarity can be a closed loop system (easily installed into an existing pool or spa unit or which can be built into a new pool or spa unit) where the control unit repeatedly determines water clarity and sends a signal to the water treatment system to adjust treatment of the water if necessary based on the clarity of the water.

In a particularly useful embodiment, the invention is directed to a system, method and apparatus for determining and controlling water clarity in a salt water pool or spa. The salt water in the pool or spa is directed to a water chamber and associated control unit that are designed to determine the clarity of the salt water and then send a signal to a chlorine or bromine generator (which changes salt in the water to chlorine or bromine via electrolysis) that is in communication with the salt water in the pool or spa to adjust the output from the chlorine/bromine generator, if necessary, so that a consistent free chlorine or bromine level can be maintained in the pool or spa.

BACKGROUND OF THE INVENTION

Salt water pools and spas have become increasingly popular over the last several years. Chlorine generating salt water pools and spas are the most common and utilize systems that transform salt in the water (NaCl) to pure Chlorine (Cl) through electrolysis. In water, this quickly forms hypochlorous acid (HClO) and sodium hypochlorite (NaClO) which function as sanitation byproducts. After reacting with the contaminants in the water, these sanitation byproducts revert back to salt. The salt is then converted to chlorine again through electrolysis, and the process continues to repeat itself. This largely eliminates the need for the addition of outside sanitizers. These types of generators are installed with open loop control systems and the run time for the generator is usually set manually.

Non-salt water pools and spas may use chemical feed systems to sanitize the water in the pool or spa. These systems may be automatic or manual and, like the chlorine generator described above, they are typically installed with open loop systems where the chemical feed or sanitizer generator are set manually.

Manually setting the run time for the generator in a salt water pool or spa, or for the chemical feed or sanitizer systems in a non-salt water pool or spa, is effective provided that the sanitation demand on the system is constant. If the load is too high, the system will not generate enough sanitizer, resulting in under sanitation. In these cases, unhealthy organic build up or microbial life may develop. Alternatively, if the load is too light, extra chlorine or extra sanitizer may be generated resulting in irritation to bathers, equipment corrosion, and reduced generator cell life or reduced equipment life.

Over sanitation and under sanitation are particularly problematic in spa sanitizer systems, especially the newly developed spa sanitizer systems for salt water spas. Unlike swimming pools, many spas sit idle for long periods of time. They are generally covered and often have sophisticated filtration and sanitation systems. In these cases, it is possible that a sanitizer or a chlorine/bromine generator (in the case of salt water spas) set for one type of use one week may produce far too much sanitizer the next week when the spa goes unused and remains covered. The result can be severe corrosion of internal components and/or external decorative stainless jet trim, and severe deterioration of spa pillows, spa covers, and even jet seal O-rings.

The simplest way to overcome these problems associated with over sanitation is to include feedback to eliminate over-sanitation and over-chlorination. On the most popular spa systems available today, this is done by a timer that shuts down the system and forces the user (via indicator lights on the spa) to test the water and reset use parameters on the control system. This produces a somewhat modified open loop system. An ideal system would actually analyze the water and determine exactly how much sanitizer or chlorine is needed for proper sanitation, and how much will result in over sanitation or chlorination. From a practical standpoint, this has been historically difficult and expensive to implement on a consumer-level scale.

A more practical solution is to use an analog to proper sanitation—something that is readily (and inexpensively) measured. Fortunately, anyone who has owned a spa knows that the most common way to determine whether or not the water needs attention is simply by looking at it—i.e. by checking the clarity or opacity of the water. Accordingly, there is a need for a simple and inexpensive system and apparatus that can measure the water clarity or opacity in a pool or spa (or any other body of water) which can be easily incorporated into, and/or associated with, an existing water treatment system that already functions with the pool or spa (or any other body of water).

SUMMARY OF THE INVENTION

The present invention is directed to a system and apparatus for determining and controlling water clarity where the water clarity is used to determine whether a water treatment system connected to the water needs to be adjusted. In other words, water clarity in a pool, spa, water cistern, or any other body of water is evaluated and used to determine whether an existing water treatment system in communication with the water needs to be adjusted to maintain a sanitization level of the water where the sanitization level is determined by the water clarity.

In one exemplary embodiment of the invention, the invention is directed to an apparatus for determining and controlling water opacity or clarity that includes a water chamber having a water inlet, a water outlet, and a transparent member, a light source positioned near the transparent member for lighting the water contained in the water chamber, a light sensitive detection unit for detecting the light, and a control unit capable of receiving an output signal from the light sensitive detection unit for determining the opacity or clarity of the water contained within the water chamber. The control unit may also be capable of determining and sending a target signal to a water treatment system which functions to treat the water that flows through the water chamber.

In another exemplary embodiment of the apparatus of the present invention for determining and controlling water clarity or opacity, the apparatus includes a water chamber having opposing open ends and a water inlet and water outlet located between the opposing ends, a transparent lens covering each of the opposing open ends of the water chamber, a light source positioned at one opposing end of the water chamber, a light sensitive detection circuit positioned at the other opposing end of the water chamber, and a control unit capable of receiving an output signal from the light sensitive detection circuit and determining a target signal to send to a water treatment system which functions to treat water. The apparatus may also include an end cap placed over each transparent lens. The light sensitive detection circuit may include, but is not limited to, one or more of the following: a photoresistor, a photodiode, a phototransistor, and a photovoltaic cell. Further, the water chamber may comprise any number of shapes which facilitate building it into an existing pool or spa system including, but not limited to, a cylindrical shape that can be easily fitted between existing water lines and/or existing water filtration systems. In addition, the apparatus may include a local indicator connected to the control unit, and positioned close to a body of water that is capable of entering the water inlet of the water chamber, for indicating an opacity or clarity level of the water in the water chamber based on the output signal from the light sensitive detection circuit. The apparatus of the present invention may also include a remote indicator connected to the control unit, and positioned remotely from a body of water that is capable of entering the water inlet of the water chamber, for indicating an opacity or clarity level of the water in the water chamber based on the output signal from the light sensitive detection circuit. Further, such a remote indicator may be wirelessly connected to the control unit.

In still another exemplary embodiment, the present invention includes an apparatus for determining and controlling water clarity or opacity in a treatable body of water that includes a water chamber having opposing open ends, a water inlet for receiving water from a treatable body of water, and a water outlet for releasing water from the water chamber, the water inlet and outlet being positioned between opposing open ends of the water chamber, a transparent lens covering each of the opposing open ends of the water chamber, a light source positioned at one opposing end of the water chamber, a light sensitive detection circuit positioned at the other opposing end of the water chamber, and a control unit capable of both receiving an output signal from the light sensitive detection circuit and computing a target signal to send to a water treatment system which functions to treat the treatable body of water. The apparatus may also include an end cap placed over each transparent lens. The light sensitive detection circuit may include, but is not limited to, one or more of the following: a photoresistor, a photodiode, a phototransistor, and a photovoltaic cell. Further, the water chamber may comprise any number of shapes which facilitate building it into an existing pool or spa system including, but not limited to, a cylindrical shape that can be easily fitted between existing water lines and/or existing water filtration systems. In addition, the apparatus may include a local indicator connected to the control unit and positioned close to the treatable body of water for indicating an opacity or clarity level of the water in the water chamber based on the output signal from the light sensitive detection circuit. The apparatus of the present invention may also include a remote indicator connected to the control unit and positioned remotely from the treatable body of water for indicating an opacity or clarity level of the water in the water chamber based on the output signal from the light sensitive detection circuit. Further, such a remote indicator may be wirelessly connected to the control unit.

The present invention is also directed to a system for determining and controlling water opacity or clarity in a treatable body of water contained in a water containment apparatus which includes a body of water contained in the water containment apparatus, a light source capable of lighting up the water contained in the water containment apparatus, at least one transparent window positioned within the water containment apparatus, a light sensitive detection circuit positioned near said at least one transparent window, and a control unit capable of receiving an output signal from the light sensitive detection circuit for determining an opacity or clarity level of the body of water. The system may also include a local indicator connected to the control unit and positioned close to the body of water for indicating the clarity or opacity level of the body of water based on the output signal from the light sensitive detection circuit. In addition, the system may also include a remote indicator connected to the control unit and positioned remotely from the body of water for indicating the clarity or opacity level of the body of water based on the output signal from the light sensitive detection circuit. When the system includes a remote indicator, the remote indicator may be wirelessly connected to the control unit. The water containment apparatus may include, but is not limited to, a spa, a pool, a water trough, a water cistern, or a water tank. The system may further include a water treatment system connected to the body of water and the control unit where the control unit is also capable of computing and sending a target signal to the water treatment system to treat the body of water. The water treatment system may include, but is not limited to, any of the following: a bromine generator, a chlorine generator, a filtration device, and a chemical injection system. In addition, the control unit may be capable of repeatedly communicating with the water treatment system to maintain a predetermined level of an active disinfectant within the body of water where the predetermined level of the active disinfectant is determined based on the clarity level of the body of water. The water treatment system may include a chlorine generator with the control unit continually communicating with the chlorine generator to maintain a specific free chlorine level within the body of water where the specific level of free chlorine is determined based on the clarity level of the body of water.

The present invention is also directed to a method for determining and controlling water clarity in a spa and/or pool which includes the steps of a) providing a water chamber having at least one transparent window, a water inlet, and a water outlet, b) directing water from the spa and/or pool through the water chamber, c) employing a light source to light up water contained within the water chamber, d) providing a light sensitive detection circuit adjacent to the transparent window(s), and e) employing a control unit to receive an output signal from the light sensitive detection circuit to determine a clarity or opacity level of the water in the water chamber. The method may also include the step of f) utilizing the control unit to compute and send a signal to a water treatment system connected to the spa and/or pool to treat the water in the spa and/or pool. The method may further include continuously repeating steps b) through f) to maintain a predetermined level of an active disinfectant within the spa and/or pool where the predetermined level of the active disinfectant is determined based on the clarity or opacity level of the water in the water chamber. The water treatment system used in this method may be, but is not limited to, any of the following: a bromine generator, a chlorine generator, a filtration device, and a chemical injection system. If the method of the present invention is used for determining and controlling water clarity or opacity in a salt water pool and/or spa, the water treatment system may be a chlorine generator which functions to convert salt to chlorine through electrolysis with steps b) through f) being continuously being repeated to maintain a specific free chlorine level within the pool and/or spa. Finally, the method may also include the step of providing a local indicator positioned close to the pool and/or spa and/or a remote indicator positioned remotely from the pool and/or spa where the local and/or remote indicator is connected to the control unit for indicating the clarity level or opacity level of the water in the pool and/or spa.

BRIEF DESCRIPTION OF THE DRAWINGS

The subject invention will hereafter be described in conjunction with the appended drawing figures, wherein like numerals denote like elements.

DETAILED DESCRIPTION

The present invention is directed to a system, method, and apparatus for determining, controlling and continuously monitoring the water clarity or water opacity of a treatable body of water such as the water contained in a spa, a pool, or any other body of water that needs to maintain a certain level of sanitation depending on its purpose. Any of the systems, methods, or apparatus that are described herein may be used to measure water clarity (i.e the clearness of the water) or water opacity (i.e. the opaqueness of the water). Either measurement of the water can be used to determine if the water needs more treatment, less treatment, or no treatment.

Figure 1:
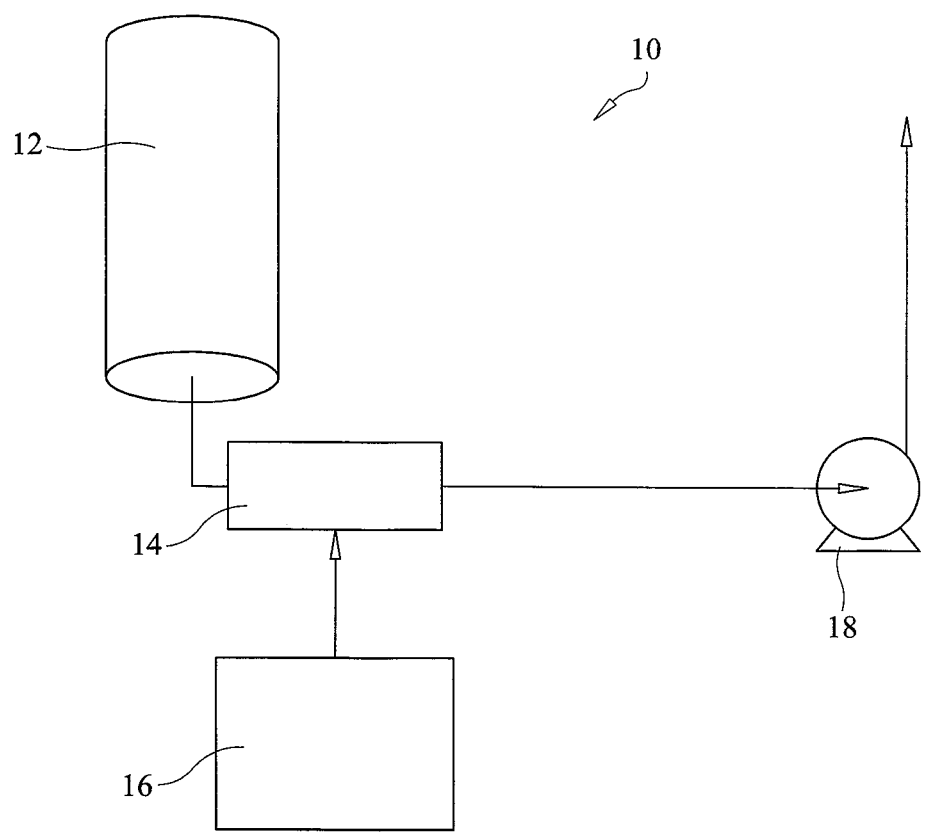
FIG. 1 is a schematic showing a prior art open loop chorine generator control system used in salt water spas and/or a prior art open loop sanitation control system used in fresh water spas or pools.

FIG. 1 is a schematic showing a prior art open loop chlorine generator control system used in salt water spas and/or a prior art open loop sanitation control system used in fresh water spas. In this open loop system 10, water from a spa (or pool) is drawn through a filter 12. Once the water passes through filter 12, it is directed to, and passes through, a generator 14 such as a chlorine generator (in the case of a salt water spa or pool) or a sanitizer injector (in the case of a fresh water spa or pool). The generator 14 has a timer control 16 associated with it which is adjusted or set manually. After passing through the generator 14, the water is returned to the spa or pool via a circulation pump 18. This system is referred to as an open loop system because the generator 14 which controls chlorine or bromine generation (in a salt water pool or spa) or the sanitization amount or level (in a fresh water pool or spa) is controlled or set manually with no automatic feedback loop to reset the generator 14. The present invention is directed to a system and method for determining and controlling water clarity or opacity that provides automated feedback to automatically adjust the generator 14.

Figure 2:
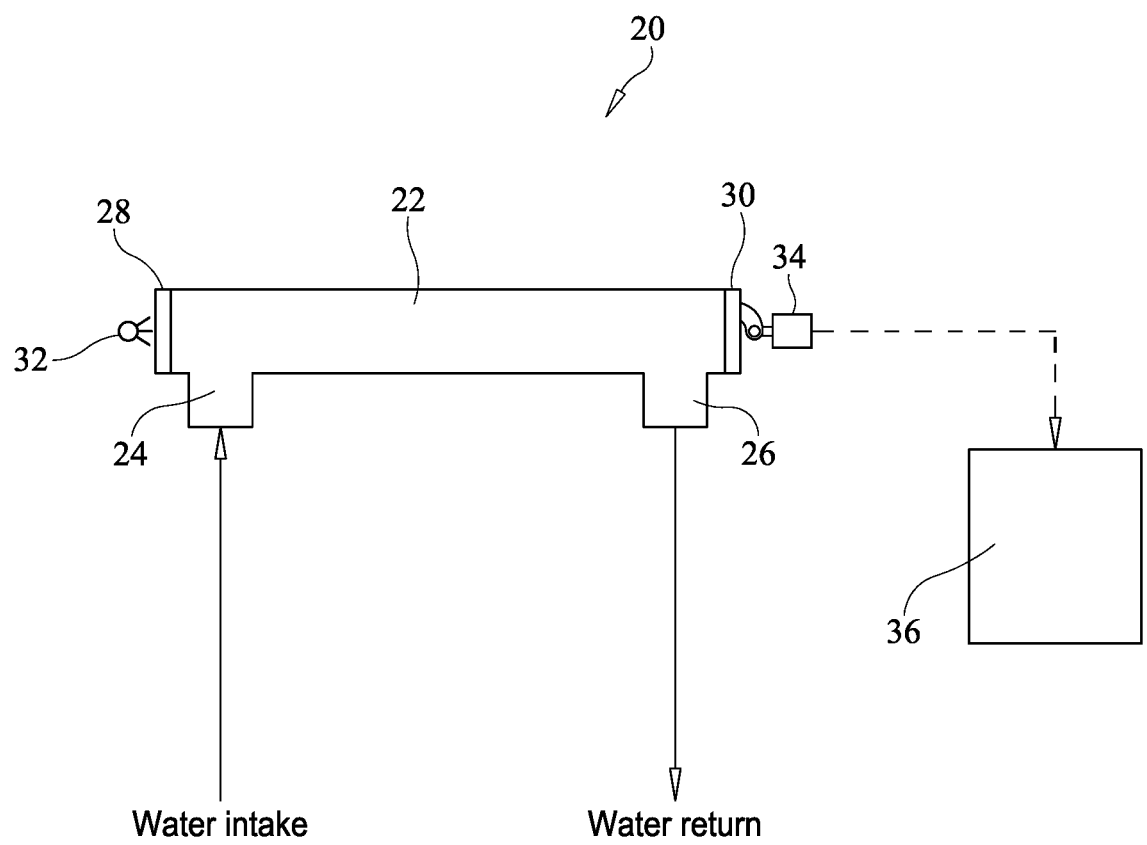
FIG. 2 is a schematic view of an exemplary embodiment of the present invention of an apparatus for determining and controlling water clarity or water opacity.

The present invention also includes an apparatus for determining and controlling water clarity or water opacity. FIG. 2 is a schematic view of an exemplary embodiment of the present invention of an apparatus 20 for determining and controlling water clarity or water opacity. Apparatus 20 includes a water chamber 22 having opposing open ends, a water inlet 24, and a water outlet 26. Opposing open ends of water chamber 22 are each covered with a transparent lens 28, 30. A light source 32 is positioned at one opposing end of the water chamber 22 while a light detection circuit 34 is positioned at the other opposing end of the water chamber 22. The light detection circuit 34 detects light contained within the water in the water chamber 22 and sends an output signal to a control unit 36 which determines the water clarity or water opacity of the water contained in the water chamber 22. The control unit 36 then determines whether the water in the spa or pool needs more treatment, less treatment, or no treatment based on the water clarity or water opacity and sends a signal to a treatment system to adjust treatment of the water if necessary.

Figure 3:
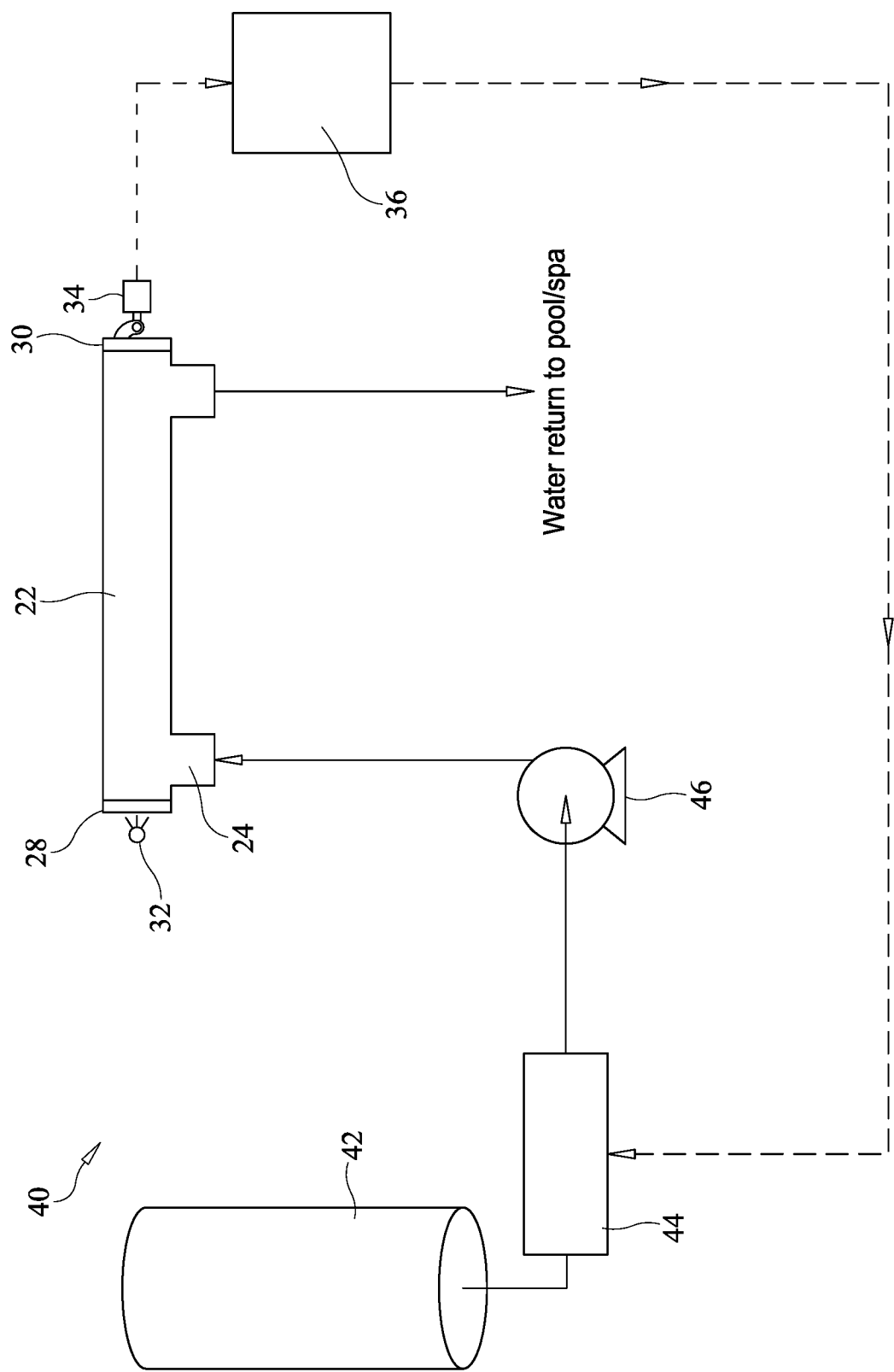
FIG. 3 is a schematic of an exemplary closed loop system of the present invention for determining and controlling water clarity or water opacity in a spa or pool.

FIG. 3 is a schematic of an exemplary closed loop system of the present invention for determining and controlling water clarity or water opacity in a spa or pool. System 40 for determining and controlling water clarity or water opacity includes a filter 42 though which water enters the system.

After filtration, the water passes through a generator 44 before being drawn into the circulation pump 46. The generator 44 may be a chlorine or bromine generator (which uses salt in the water in a salt water spa or pool to create either chlorine or bromine via electrolysis) or a sanitizer injector (which injects a chemical sanitizer such as bromine, chlorine, or some other chemical into fresh water contained in a fresh water spa or pool). After passing through the circulation pump 46, the water is directed into the water inlet 24 of the water chamber 22. Light source 32 lights up water contained in the water chamber 22 by shining light through transparent lens or window 28. Light detection circuit 34 detects light within the water through transparent lens or window 30 and sends a signal to control unit 36. Control unit 36 determines water clarity or water opacity and whether the water in the water chamber needs more treatment, less treatment, or no change in treatment. Control unit 36 then computes the proper signal to send to generator 44 to adjust generator 44 to properly treat the water. Control unit 36 may use an algorithm to maintain water clarity while minimizing "on" time of the generator 44. In effect, it "hunts" for the lowest use level of the generator that works to maintain water clarity. If at some point the water clarity begins to deteriorate, control unit 36 resets to the maximum level until water clarity returns. As water clarity is restored, the control unit 36 begins to back down on the run time of the generator 44 thereby "hunting" for the proper use level of generator 44. In FIG. 3, solid lines represent water connections and water flow through those connections while dashed lines represent electrical connections.

As an example of how this system might be implemented, consider a chlorine generator system used in a salt water spa that is set to run 10 hours per day under moderate use conditions. Assume the owner goes on vacation and the use of the spa drops to zero use. If the system of the present invention determines that the water is clear, the system may reduce output by 10% daily from the chlorine generator until the system determines that there is an increase in the opacity of the water. Once the system detects an increase in the opacity of the water, it may increase output by 10% for one day. In the event that opacity of the water continues to increase, it may continue to increase output from the chlorine generator until opacity of the water stabilizes or begins to decrease. The system of the present invention can be used as a stand alone means of feedback or as a means of augmenting the open loop control systems currently used in the prior art.

With respect to the components of the system, the light source could be an LED in its simplest form or any other light source such as, but not limited to, a laser light source, an infra-red light source, an incandescent light source, a fluorescent light source, etc. In its simplest form, the light sensitive detection circuit could be a photoresistor used as the gain resistor in an operational amplifier. In addition, the light sensitive detection circuit may include, but is not limited to, any one or more of the following: a photodiode, a phototransistor, and a photovoltaic cell. The lenses would most likely be acrylic, as acrylic is inexpensive and very resistant to pool and spa chemicals. Those skilled in the art will recognize that there are numerous and varied options for designing light sensitive detection circuits and the examples set forth here are not meant to be limiting in any way.

The exemplary apparatus of the present invention shown in FIG. 2 is ideally located/positioned after the filter and before the heater in an existing spa system. The apparatus can be easily removed, cleaned, and replaced if needed. If it is not practical to position the apparatus of the present invention before the chlorine generator in a salt water spa or before a sanitizer injection point/chlorine or bromine generator in a fresh water spa, it may be necessary to ignore the readings from the apparatus of the present invention when the generator or injector is operating. Chlorine (or bromine) generator control in a salt water spa and sanitizer feed control in a fresh water spa requires attention in the design of the present invention. In general, low opacity (clear water) means that minimal sanitizer is needed and the chlorine (or bromine) generator (in the salt water system) need only run minimally, and the sanitizer injector (in the fresh water system) needs only minimum output. With salt water spas, the design may be able to integrate measurements over time thereby decreasing run time of the generator as repeated clear measurements accumulate over time. If the opacity of the water increases, the—generator can increase output until the opacity of the water decreases. With either fresh or salt water spas or pools, the controller may be able to maintain a stable sanitizer minimum output in clear water conditions that is needed to maintain a particular sanitizer level in a particular size of spa or pool.

It may be necessary to refrain from determining water clarity or water opacity using the system, method and apparatus of the present invention during certain periods of spa or pool operation including when a chlorine (or bromine) generator is running in a salt water spa or pool and when a sanitizer injector is running in a fresh water spa or pool. The generator or injector may create fine bubbles which could produce a false high opacity. It may also be necessary to refrain from determining water clarity or water opacity when the jets in the spa or certain pool filtration equipment is running since some such equipment may cause air to be trapped in the water which could also produce a false high opacity reading. There may also be a need to override or reset the readings for water clarity or water opacity in instances where the introduction of additives temporarily cloud the water.

The system for determining and controlling water clarity of the present invention may also allow for the degradation of the water chamber and its associated components by periodically recalibrating, either automatically or manually, and by adjusting output based on calibration measurements over time. Advantages of the system, method and apparatus of the present invention for determining and controlling water clarity or water opacity include 1) providing feedback to an otherwise open loop control system at low cost, 2) increasing the life span of the chlorine (or bromine) generator (in the salt water systems) and decreasing sanitizer use in the fresh water systems while still maintaining safe sanitizer levels, 3) decreasing the likelihood of over chlorination/sanitation and resulting spa damage, and 4) the utilization of simple and inexpensive feedback measurement technology.

Figure 4:
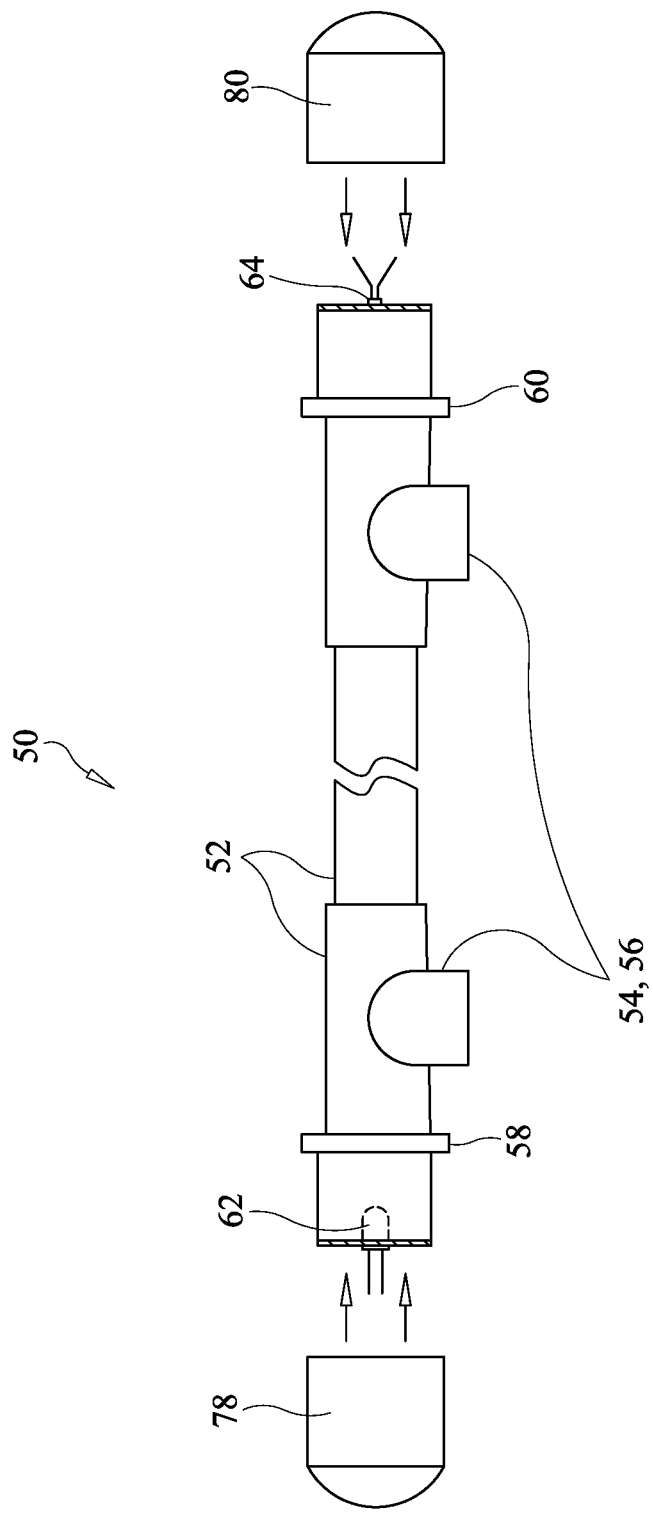
FIG. 4 is a side elevational view of an exemplary embodiment of an apparatus of the present invention for determining and controlling water clarity or water opacity shown alone without being connected to a control unit.

FIG. 4 is a side elevational view of an exemplary embodiment of an apparatus 50 of the present invention for determining and controlling water clarity or water opacity shown alone without being connected to a control unit. Apparatus 50 shown in FIG. 4 includes a water chamber 52 (that can be made of one or more components) having opposing open ends, a water inlet 54, and a water outlet 56. Opposing open ends of water chamber 52 are each covered with a transparent lens 58, 60. A light source 62 is positioned at one opposing end of the water chamber 52 while a light detection circuit 64 is positioned at the other opposing end of the water chamber 52. The light detection circuit 64 detects light contained within the water in the water chamber 52 and sends an output signal to a control unit (not shown) which determines the water clarity or water opacity of the water contained in the water chamber 52. End caps 78, 80 are positioned over transparent lenses 58, 60 to provide protection and wiring strain relief for light source 62 and light detection circuit 64. The edges and backs of transparent lenses 58, 60 may be blacked out to prevent ambient light intrusion.

Figure 5:
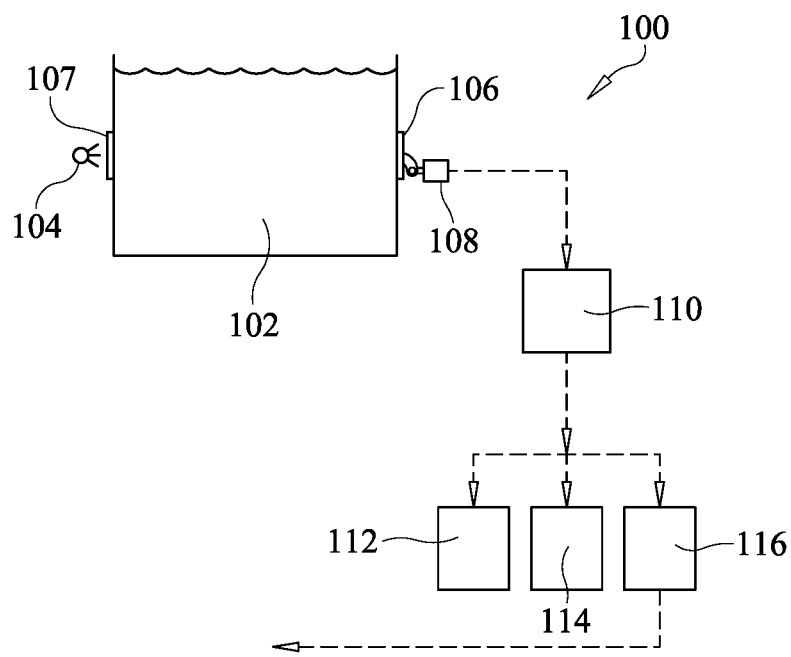
FIG. 5 is another exemplary embodiment of a water clarity monitoring and control system of the present invention for monitoring and controlling water clarity in a treatable body of water.

FIG. 5 is another exemplary embodiment of a water clarity monitoring and control system of the present invention for monitoring and controlling water clarity in a treatable body of water. Water clarity monitoring and control system 100 includes a body of water contained in a water containment apparatus 102 (such as, for example, but not limited to, a pool, a spa, a water trough, a water cistern, and a water tank), a light source 104 capable of lighting up the water contained in the water containment apparatus 102, at least one transparent window 106 positioned within the water containment apparatus 102, a light sensitive detection circuit 108 positioned near at least one transparent window 106 in the water containment apparatus 102, and a control unit 110 capable of receiving an output signal from the light sensitive detection circuit 108 for determining a clarity level of the body of water. FIG. 5 also shows another transparent window 107 contained within the water containment apparatus 102 where the light source 104 is positioned on the outside of the water containment apparatus 102 near the transparent window 107.

System 100 also includes an optional local indicator 112 connected to the control unit 110 and positioned close to the body of water for indicating the clarity level or opacity level of the body of water, an optional remote indicator 114 connected to the control unit 110 and positioned remotely from the body of water for indicating the clarity level or opacity level of the body of water, and an optional generator control system 116 for controlling output to a chemical feeder generator or some other water quality control mechanism that is capable of treating the body of water. The local indicator 112 is particularly useful in the case of a closed spa or a closed cistern where water quality cannot be monitored without opening a lid or manway. The remote indicator 114 is particularly useful when the body of water is far away from the entity or individual that needs to monitor it. The remote indicator 114 can be accomplished via a hardwired remote indicator or via a handheld device using a computer or cellular phone network. The generator control system 116 may operate one or more of the following: filtration pumps, chemical feeders, chlorine or bromine generators, ozone or UV systems, or some other water quality improvement device or devices.

Figure 6:
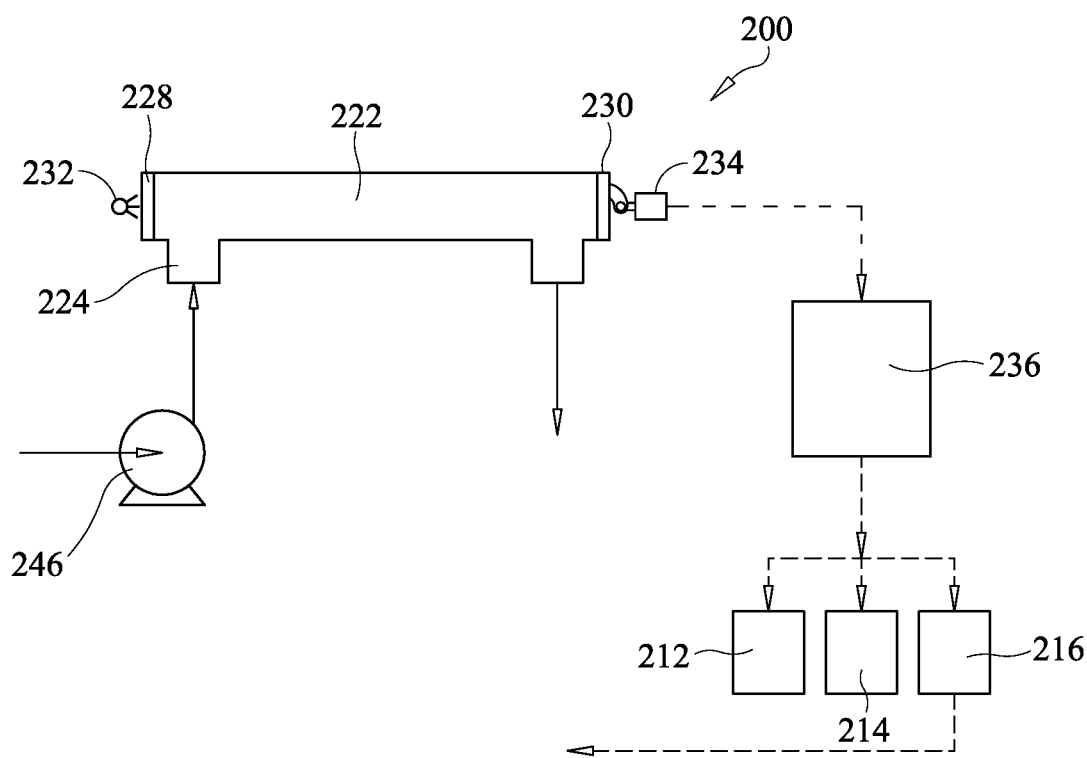
FIG. 6 is yet another embodiment of a water clarity monitoring and control system of the present invention for monitoring and controlling water clarity in a treatable body of water having an apparatus for monitoring and controlling water clarity integrated into an existing filtration system for a pool or spa.

FIG. 6 is yet another embodiment of a water clarity monitoring and control system of the present invention for monitoring and controlling water clarity in a treatable body of water having an apparatus for monitoring and controlling water clarity integrated into an existing filtration system for a pool or spa. In this exemplary embodiment of system 200, water from a pool, spa, or other water containment apparatus flow through circulation pump 246 and into a water chamber 222. After passing through the circulation pump 246, the water is directed into the water inlet 224 of the water chamber 222. Light source 232 lights up water contained in the water chamber 222 by shining light through transparent lens or window 228. Light detection circuit 234 detects light within the water through transparent lens or window 230 and sends a signal to control unit 236 for determining a clarity level or opacity level of the body of water.

Like system 100 shown in FIG. 5, system 200 also includes an optional local indicator 212 connected to the control unit 236 and positioned close to the pool, spa, or water containment apparatus for indicating the clarity level or opacity level of the body of water, an optional remote indicator 214 connected to the control unit 236 and positioned remotely from pool, spa, or water containment apparatus for indicating the clarity level or opacity level of the body of water, and an optional generator control system 216 for controlling output to a chemical feeder generator or some other water quality control mechanism that is capable of treating the body of water. The local indicator 212 is particularly useful in the case of a closed spa or a closed cistern where water quality cannot be monitored without opening a lid or manway. The remote indicator 214 is particularly useful when the body of water is far away from the entity or individual that needs to monitor it. The remote indicator 214 can be accomplished via a hardwired remote indicator or via a handheld device using a computer or cellular phone network. The generator control system 216 may operate one or more of the following: filtration pumps, chemical feeders, chlorine or bromine generators, ozone or UV systems, or some other water quality improvement device or devices.

In FIGS. 5 and 6, solid lines represent water connections and water flow through those connections while dashed lines represent electrical connections. The purpose of system 100 and system 200 is to provide accurate readings and therefore requires that determination or measurement of water clarity or water opacity be performed at times of minimum interference. Items that might interfere with accurate determinations/measurements include operation of pumps or aerators, injection of chemicals, ambient light sources, temperature variations, etc. System 100 and system 200 either do not make determinations/measurements at these times or alternatively compensate for the variations in the determinations/measurements. Advantages of water clarity monitoring and control systems 100 and 200 of the present invention include 1) providing quantitative water quality information at a low price, 2) easy integration into new pool, spa, and water containment apparatus and easy retrofitting into existing pool, spa, and water containment apparatus, 3) ability to remotely indicate water quality information, and 4) ability to easily use in feedback control systems at low cost.

Figure 7:
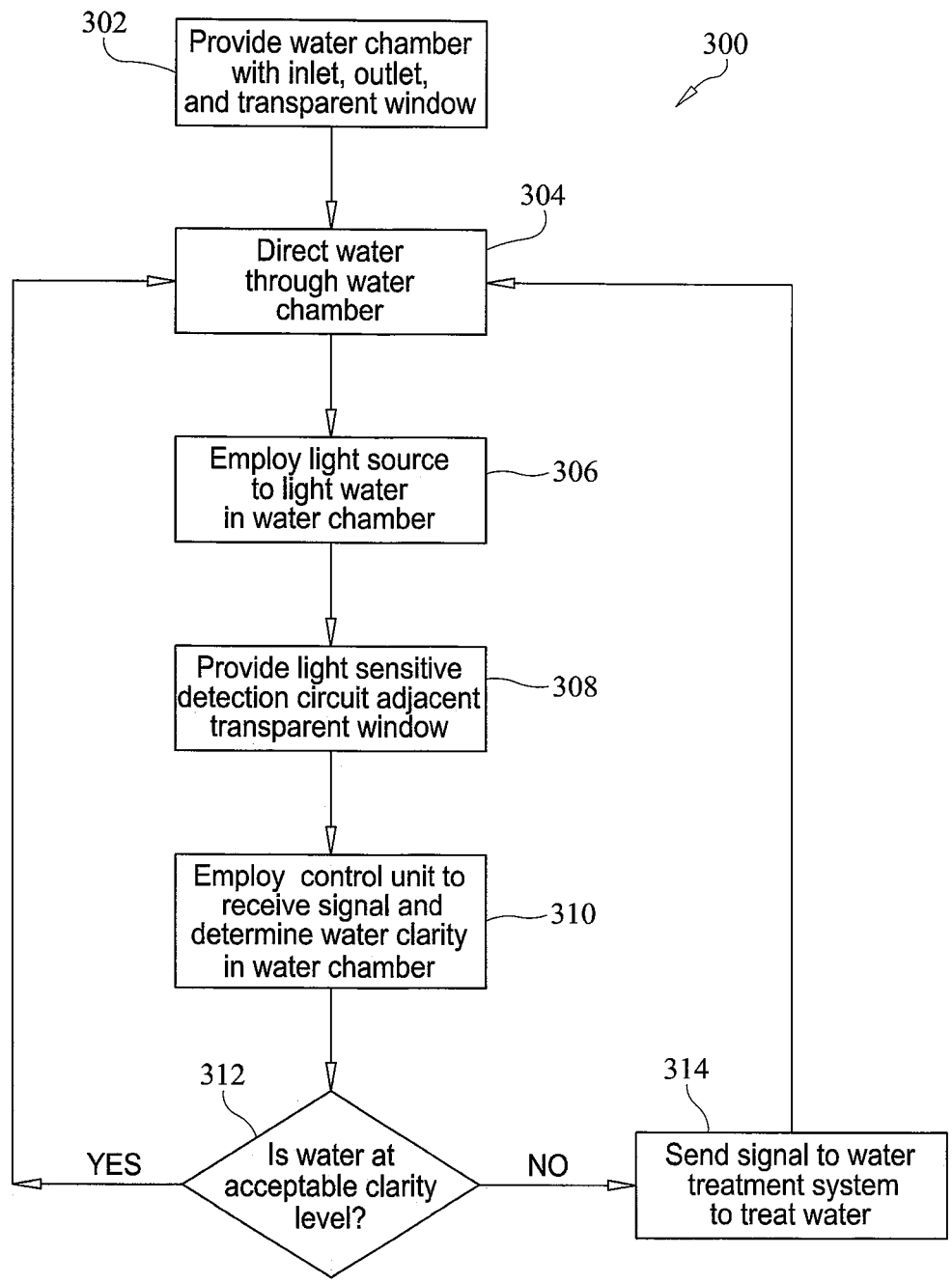
FIG. 7 is a flowchart showing an exemplary method of the present invention for determining and controlling water clarity in a pool or spa.

A flowchart showing an exemplary method 300 of the present invention for determining and controlling water clarity in a pool or spa is depicted in FIG. 7. In method 300, a water chamber is provided having a water inlet, a water outlet, and a transparent window in step 302. The water from a pool or spa is then directed through the water chamber in step 304 via the water chamber inlet and outlet. Next, in step 306, a light source is employed to light up the water in the water chamber and in step 308 a light sensitive detection circuit is positioned near the transparent window of the water chamber. A control unit is employed to receive a signal from the light sensitive detection unit to determine water clarity in step 310. An evaluation is made in step 312 to determine if the water clarity is at an acceptable level. If the water clarity is not at an acceptable level, a signal is sent to a water treatment system in step 314 to treat the water. Once treated, the water is again directed through the water chamber in step 304 and steps 304 through 312 are continuously repeated to monitor and adjust the water clarity. If the water clarity is at an acceptable level, water continues to be directed through the water chamber in step 304 and steps 304 through 312 are continuously repeated to monitor and adjust the water clarity.

The detailed description of exemplary embodiments of the invention herein shows various exemplary embodiments and the best modes, known to the inventor at this time, of the invention. These exemplary embodiments and modes are described in sufficient detail to enable those skilled in the art to practice the invention and are not intended to limit the scope, applicability, or configuration of the invention in any way. Rather, the following disclosure is intended to teach both the implementation of the exemplary embodiments and modes and any equivalent modes or embodiments that are known or obvious to those reasonably skilled in the art. Additionally, all included figures are non-limiting illustrations of the exemplary embodiments and modes, which similarly avail themselves to any equivalent modes or embodiments that are known or obvious to those reasonably skilled in the art.

Other combinations and/or modifications of structures, arrangements, applications, proportions, elements, materials, or components used in the practice of the instant invention, in addition to those not specifically recited, can be varied or otherwise particularly adapted to specific environments, manufacturing specifications, design parameters, or other operating requirements without departing from the scope of the instant invention and are intended to be included in this disclosure.

The invention claimed is:

1. Apparatus for determining and controlling water opacity comprising:
    a water chamber having opposing open ends and a water inlet and water outlet located between the opposing open ends such that the water inlet and the water outlet are positioned on a same side of the water chamber so that they are parallel with one another and the water inlet is located near one of the opposing open ends of the water chamber and the water outlet is located near the other of the opposing open ends of the water chamber;
    a first transparent lens which covers one of the opposing open ends of the water chamber and another transparent lens which covers the other of the opposing open ends of the water chamber;
    a light source positioned at one of the opposing open ends of the water chamber located near the water inlet;
    a light sensitive detection circuit positioned at the other of the opposing open ends of the water chamber located near the water outlet; and
    a control unit capable of receiving an output signal from the light sensitive detection circuit and determining a target signal to send to a water treatment system which functions to treat water.

2. The apparatus of claim 1 wherein the light sensitive detection circuit includes at least one of a photoresistor, a photodiode, a phototransistor, and a photovoltaic cell, and the light source includes at least one of a light emitting diode, a laser, an incandescent light source, and a fluorescent light source.

3. The apparatus of claim 1 further comprising a first end cap placed over the light source and a second end cap placed over the light detection circuit.

4. The apparatus of claim 1 further comprising a local indicator connected to the control unit for indicating an opacity level of the water in the water chamber based on the output signal from the light sensitive detection circuit.

5. The apparatus of claim 1 further comprising a remote indicator connected to the control unit for indicating an opacity level of the water in the water chamber based on the output signal from the light sensitive detection circuit.

6. The apparatus of claim 5 wherein the remote indicator is wirelessly connected to the control unit.

7. Apparatus for determining and controlling water clarity in a treatable body of water comprising:
    a water chamber having a cylindrical shape with opposing open ends, a water inlet for receiving water from a treatable body of water located near one of the opposing open ends of the water chamber, and a water outlet for releasing water from the water chamber located near the other of the opposing open ends of the water chamber, said water inlet and outlet being positioned between the opposing open ends of the water chamber and on a same side of the water chamber so that they are parallel with one another;
    a first transparent lens which covers one of the opposing open ends of the water chamber and another transparent lens which covers the other of the opposing open ends of the water chamber;
    a light source positioned at one of the opposing open ends of the water chamber located near the water inlet;
    a light sensitive detection circuit positioned at the other of the opposing open ends of the water chamber located near the water outlet; and
    a control unit capable of receiving an output signal from the light sensitive detection circuit and computing a target signal to send to a water treatment system which functions to treat the treatable body of water.

8. The apparatus of claim 7 wherein the light sensitive detection circuit includes at least one of a photoresistor, a photodiode, a phototransistor, and a photovoltaic cell.

9. The apparatus of claim 7 further comprising a first end cap placed over the light source and a second end cap placed over the light sensitive detection circuit.

10. The apparatus of claim 7 further comprising a local indicator connected to the control unit for indicating a clarity level of the water in the water chamber based on the output signal from the light sensitive detection circuit.

11. The apparatus of claim 7 further comprising a remote indicator connected the control unit for indicating a clarity level of the water in the water chamber based on the output signal from the light sensitive detection circuit.

12. The apparatus of claim 11 wherein the remote indicator is wirelessly connected to the control unit.

* * * * *